Jan. 1, 1935.  E. W. MADGE ET AL  1,986,404
DISTRIBUTING DIVIDED MATERIAL
Filed Jan. 27, 1934
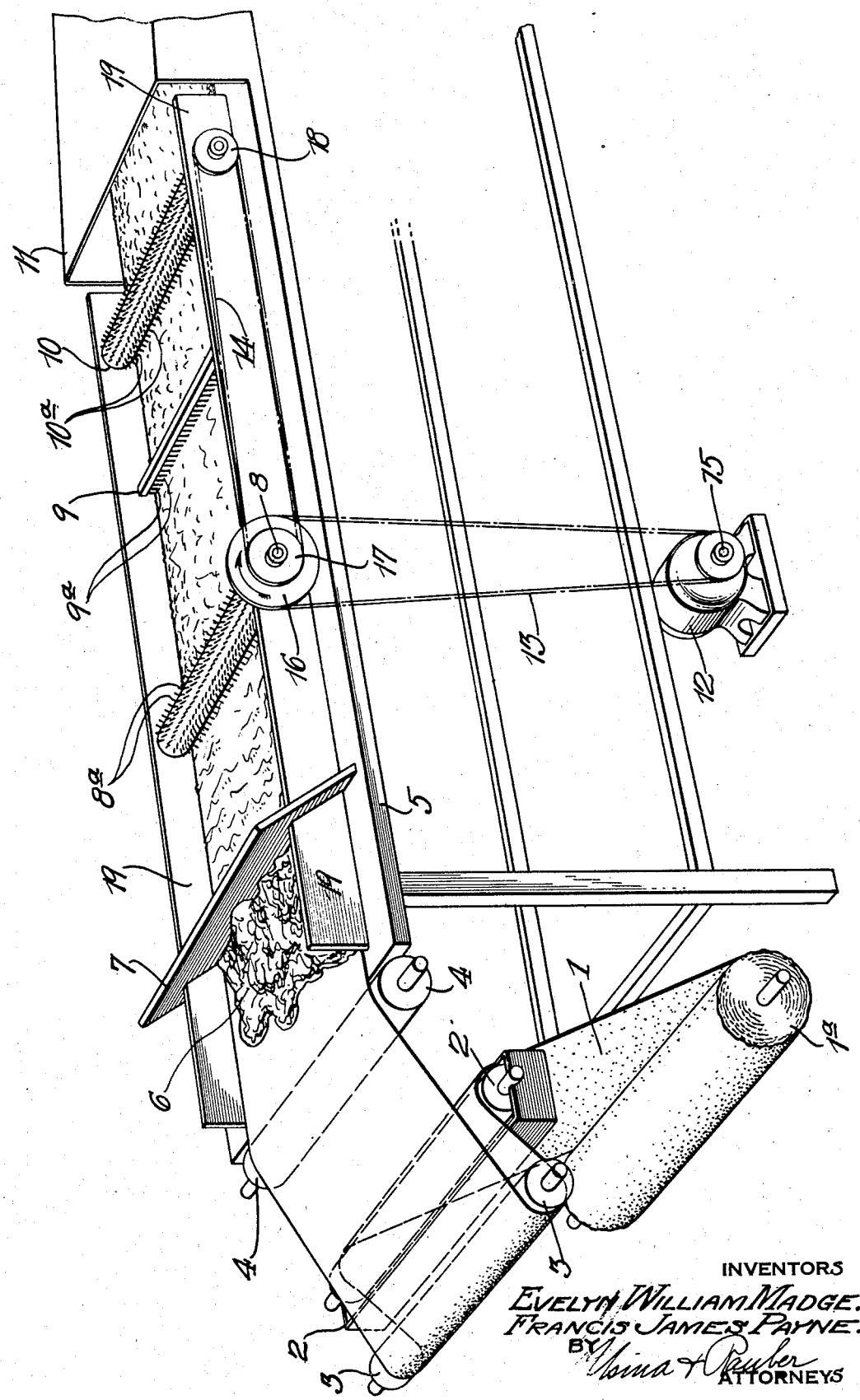

UNITED STATES PATENT OFFICE 1,986,404

DISTRIBUTING DIVIDED MATERIAL

Evelyn William Madge, Wylde Green, Birmingham, and Francis James Payne, Erdington, Birmingham, England, assignors to Dunlop Tire and Rubber Corporation, Buffalo, N. Y., a corporation of New York Application January 27, 1934, Serial No. 708,602
In Great Britain December 6, 1932

8 Claims. (Cl. 154—2)

This invention relates to improvements in methods and apparatus for distributing divided or comminuted material in wet or dry condition, whereby such material may be distributed to a given depth over a suitable surface.

More particularly, the invention concerns the distribution of comminuted material consisting wholly or partly of rubber or rubberized fabric preparatory to the formation of sheeted material, the method and apparatus being especially useful in rendering commercially possible the utilization of various forms of rubber scrap.

Such scrap may, for instance, consist wholly or partly of disintegrated sponge rubber in processes where the ultimate object is to produce sponge rubber sheeting or a composite sheet consisting of a layer of disintegrated sponge rubber secured to a backing of textile fabric and applicable, for instance, as a carpet underlay.

Alternatively, the material selected for distribution and suitable to the purpose may consist of a comminuted material comparatively hard as compared with a comminuted soft or spongy crumb rubber, the comparatively hard material such as ground cork after distribution being passed through consolidating rollers to produce a sheet resembling linoleum.

Hitherto, great difficulty has been experienced in distributing wet or dry material in crumb-like form into a uniform homogeneous sheet suitable, if required, for subsequent consolidation into a layer of even density and of substantially uniform cushioning capacity.

Attempts to spread such material have resulted in local drag and uniformity and is not obtained, owing to the fact that high spots are consolidated and in consequence a sheet of uneven density results.

The object of the present invention is to provide a method and apparatus whereby the above material may be fed on to a surface or on to a backing to which it may subsequently be secured, with an equality in the density of distribution hitherto unattained and with an equally effective regulation of the depth of deposition or surface level.

The invention is also characterized by its suitability for employment in continuous production processes and by the comparative simplicity of the apparatus required for its operation.

In the present invention a plurality of individual series of pins or spikes are arranged, some to be carried round in a circular path and others stationary, differing from previously proposed arrangements where picker rolls rotate to brush off surplus material to deliver a band of substantially uniform thickness in the manufacture of fibre-concrete sheets.

Our invention provides a method of forming coated sheet material by distributing divided material in uniform layers on an adhesively treated travelling surface to a predetermined depth by relative movement of the comminuted material against a plurality of pins or spikes which comb the surface in succession, some of the pins or spikes being non-moving relative to the point where the material is fed, and some are carried round in a circular path about an axis transverse to the said travelling surface.

The initial deposit of the divided material is roughly regulated by a fixed series of pins or spikes or a fixed plate with subsequent distribution of the material, by first a series of pins or spikes carried round in a circular path about a transverse axis, second a series of pins or spikes stationary with respect to the point where the material is fed, and third a further series of pins or spikes carried round in a circular path.

In apparatus for accomplishing the method according to this invention of distributing comminuted material there is provided, in operable sequence, first a plate adapted to roughly regulate the initial deposit of the material, second a transversely disposed revolvable shaft from the surface of which project a series of pins or spikes, third a stationary bar member having a series of pins or spikes projecting from its surface adjacent the material, and fourth a revolvable shaft similar to that referred to as second.

The pins or spikes in any or all of the series thereof are arranged in a plurality of rows extending longitudinally of the bar member and/or the revolvable shafts, the spacing of the pins in one row being staggered in relation to that of the spikes or pins of adjacent rows.

In one embodiment of the invention in which comminuted sponge rubber is the material to be distributed, the rubber wetted with suitably designated aqueous dispersions of rubber is suitably fed to a movable backing surface of textile fabric caused to travel beneath a feed control and, after being acted upon by pins or spikes, passes over an internally heated surface such as a steam chest upon which the deposit may be dried and vulcanized during its progress or in successive lengths.

The depth of the initial deposit is restricted to a maximum by the feed control, and from here the deposited comminuted material is carried forward and beneath a revolving shaft where it is acted upon by the spikes or pins carried thereby and projecting to the required and uniform extent from the face thereof.

Continued movement of the backing carries the deposited comminuted material beneath a stationary bar member carrying at least one row of spikes or pins projecting uniformly from the face thereof and towards the moving backing carrying the comminuted material so that this operates after the manner of a stationary rake to co-operate in the distribution and even levelling of the comminuted material.

Finally, a further revolving shaft similar to and operating similarly to the revolving shaft following the feed control operates as a final distributor of the comminuted material, the projecting spikes being arranged in parallel rows longitudinally of the shaft, the spacing of the pins in one row being staggered with respect to that of adjacent rows, this contributing to even distribution.

If, however, continuous furrows are required longitudinally of the fabric the incidence of the combing "contacts" upon the material may be varied across the shaft by varying their distribution or length of the spikes thus producing a material with furrows of controlled height and depth.

The comb "contacts" which may be radially or obliquely set to their revolving support are revolved by the shaft so that those in the working position beneath the shaft are moving against the direction of travel of the moving surface, which preferably moves continuously in one direction.

The particles which are above the required level which is the distance beneath the end of each pin when extending downwards vertically from the shaft and the upper surface of the fabric receives the impact of the pins and are thrown back or deflected sideways, this action taking place across the whole surface of the backing.

The spikes may be of the order of an inch in length with approximately ½ inch spacing and the roller may be driven at 250 R. P. M., against the material which if wet may be fed along at 2 to 3 feet per minute, but if the material is dry it may be fed more quickly.

The use of two or more of these rotary combs together with stationary combs is of advantage for the following reasons.

The straight edge shield functions as an initial control of the maximum depth of comminuted material which the movable backing is allowed to feed forward to the first rotating comb.

The first rotating comb effects an initial distribution of the comminuted material to a rough gauge and particularly functions to ensure that the comminuted material is properly broken up and to dispose of any tendency towards agglomeration which might otherwise occur in the wetted crumb rubber.

Owing to an excess layer between the initial feed point and the first rotary comb, some of the particles are carried or thrown over the rotary comb giving a slightly uneven surface to the material which has passed it.

The stationary rake to which the comminuted material is then carried operates to control as it were the excess of material which passes the first rotating comb and being stationary has not the tendency of a rotary comb to carry or throw over excess material which would otherwise tend to "bank" itself against the final rotating comb and so become a potential interference with the proper functioning of the latter which is to effect a final distribution of the comminuted material to a depth which experience has proved to be satisfactorily even.

Further distributors either of the stationary or rotary type may be added as required, the rotary combs being rotated against the direction of movement of the material.

In order that this invention may be more clearly understood and readily carried into practical effect, reference is made in further describing the same to the accompanying drawing consisting of a diagrammatic perspective view of apparatus embodying the invention.

Referring to the drawing, the backing 1 passes from a roll 1a and receives a coating of rubber adhesive by means such as a suitable roller and trough 2 and then passes over rollers 3 and 4 to a table 5, where the comminuted material 6 is fed onto the backing immediately before it passes beneath the feed control 7.

From here, the travelling backing carries the comminuted material beneath the first revolving shaft 8 from the surface of which project spikes or pins 8a arranged in rows longitudinally of the shaft, the spacing of the pins in one row being staggered in relation to that of the pins in adjacent rows.

A stationary bar 9 having projecting spikes or pins 9a next operates in the distribution of the comminuted material which is finally acted upon by a revolving shaft 10, carrying spikes or pins 10a, projecting and arranged in similar fashion to the pins 8a on the revolving shaft 8.

After leaving the revolving shaft 10, the travelling backing carrying the distributed comminuted material is subjected to heat to dry and finally vulcanize the product and for this purpose it may pass over a suitably heated chest and as shown within a hood 11.

A source of power such as a motor 12 revolves the shafts 8 and 10 in the direction indicated by the arrows through driving bands indicated at 13 and 14 and pulleys 15, 16, 17 and 18.

Guides or side shields, as indicated at 19, are provided to limit the sideways distribution of the comminuted material.

These side shields are preferably mounted or carried by any suitable means (not shown) whereby they are spaced from the table 5 sufficiently for the clear passage beneath them of the movable backing so that any difference in the width of the latter does not interfere with the continuity of the process while the distribution is to a given and consistent width thereon.

One or more of the side shields may be adjustably mounted or carried so that it may be moved towards or away from the other.

What we claim is—

1. Apparatus for distributing divided material comprising in operable sequence, first a plate adapted to regulate roughly the initial deposit of said material, second a transversely disposed revolvable shaft from the surface of which project a series of pins or spikes, third a stationary bar member having a series of pins or spikes projecting from its surface adjacent the said material, and fourth a revolvable shaft similar to that referred to as second.

2. Apparatus for distributing divided material according to claim 1 wherein the pins or spikes in any or all of said series thereof are arranged in a plurality of rows extending longitudinally of said bar member and/or said revolvable shafts, the spacing of said pins or spikes in one row being staggered in relation to that of the spikes or pins of adjacent rows.

3. A method of forming coated sheet material which comprises placing divided material on an adhesively treated traveling surface of said sheet material, subjecting successive areas of said material to isolated impacts at intervals transversely of their direction of travel to break up and scatter said material throughout a predetermined depth, and then raking said material to a predetermined depth.

4. A method of forming coated sheet material which comprises placing divided material on an adhesively treated traveling surface of said sheet material, subjecting successive areas of said material to isolated impacts at intervals transversely of their direction of travel to break up and scatter said material throughout a predetermined depth, then raking said material to a predetermined depth, and thereafter subjecting said material to a predetermined depth to impacts at intervals throughout the width of said surface.

5. The method of claim 3 in which said impacts are in a direction opposite to the direction of travel of said sheet.

6. The method of claim 3 in which said divided material is comminuted sponge rubber.

7. The method of claim 3 in which said divided material is comminuted sponge rubber wetted with an aqueous dispersion of a cementing material.

8. The apparatus of claim 1 having side shields to limit the sidewise distribution of the comminuted material.

EVELYN WILLIAM MADGE.
FRANCIS JAMES PAYNE.